(12) United States Patent
Uchiyama et al.

(10) Patent No.: US 11,995,509 B2
(45) Date of Patent: May 28, 2024

(54) CARD PROCESSING DEVICE AND COVER MEMBER

(71) Applicant: NIDEC SANKYO CORPORATION, Nagano (JP)

(72) Inventors: Ryo Uchiyama, Nagano (JP); Keiji Ohta, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/968,441

(22) Filed: Oct. 18, 2022

(65) Prior Publication Data

US 2023/0117057 A1 Apr. 20, 2023

(30) Foreign Application Priority Data

Oct. 18, 2021 (JP) ................. 2021-170377

(51) Int. Cl.
*G06K 7/14* (2006.01)
*G06K 7/00* (2006.01)
*G07F 7/08* (2006.01)

(52) U.S. Cl.
CPC ........... *G06K 7/1404* (2013.01); *G06K 7/006* (2013.01); *G07F 7/0873* (2013.01)

(58) Field of Classification Search
CPC ...... G07F 7/0873; G07F 19/00; G07F 19/205; G06K 7/006; G06K 7/1404
See application file for complete search history.

(56) References Cited

U.S. PATENT DOCUMENTS

| 5,483,047 | A  | * | 1/1996  | Ramachandran | ....... G07F 19/20 235/379 |
| 6,024,027 | A  | * | 2/2000  | Esmaili | ................. G07F 19/205 312/242 |
| 6,296,182 | B1 | * | 10/2001 | Ota | ........................... G07F 7/04 235/492 |
| 6,328,206 | B1 | * | 12/2001 | Schanz | ................. G07F 19/205 235/379 |
| 6,736,323 | B2 | * | 5/2004  | Hochgesang | .......... H01H 13/70 235/475 |
| 6,955,293 | B1 | * | 10/2005 | Katsanevas | ............. G07F 19/20 D14/440 |
| 8,469,264 | B1 | * | 6/2013  | Almeida | ............... G07F 19/205 235/379 |

(Continued)

FOREIGN PATENT DOCUMENTS

JP 2021170377 A 10/2021

*Primary Examiner* — Daniel I Walsh
(74) *Attorney, Agent, or Firm* — CANTOR COLBURN LLP

(57) ABSTRACT

A card processing device is structured to process a card having a plurality of information recording parts from which information is capable of being optically read. The card processing device includes a placing part which is formed with a placing face on which the card is placed, a reading part which is provided on an upper side with respect to the placing face and is capable of optically reading information from at least one information recording part of the plurality of information recording parts, and an attaching part for detachably attaching a cover member which covers the at least one information recording part of the plurality of information recording parts provided on the card which is placed on the placing face.

14 Claims, 13 Drawing Sheets

(56) References Cited

U.S. PATENT DOCUMENTS

| | | | | |
|---|---|---|---|---|
| 8,561,887 B1* | 10/2013 | Kovacs | G07F 19/205 | 235/379 |
| 8,573,479 B1* | 11/2013 | Jenkins | G07F 19/201 | 235/375 |
| 8,844,807 B1* | 9/2014 | Lawver | G07F 19/00 | 235/375 |
| 8,925,799 B1* | 1/2015 | Harty | G07F 19/209 | 235/379 |
| 9,640,020 B2* | 5/2017 | Sum | G07F 17/3202 | |
| 2004/0250142 A1* | 12/2004 | Feyler | G06Q 20/341 | 235/380 |
| 2005/0103844 A1* | 5/2005 | Swaine | G07F 7/1008 | 235/440 |
| 2011/0221321 A1* | 9/2011 | Lee | G07F 19/20 | 312/327 |
| 2012/0002353 A1* | 1/2012 | Shih | G07F 19/205 | 361/679.01 |
| 2012/0280033 A1* | 11/2012 | Mitchell | G07F 19/2055 | 235/379 |
| 2013/0140363 A1* | 6/2013 | Hart | G07F 7/0873 | 235/449 |
| 2013/0303277 A1* | 11/2013 | Shigeta | A63F 1/18 | 235/375 |
| 2014/0263615 A1* | 9/2014 | Deangelo | G07D 7/0043 | 235/375 |
| 2014/0291401 A1* | 10/2014 | Nakamura | G06K 7/1413 | 235/462.08 |
| 2014/0346228 A1* | 11/2014 | Ishikawa | G11B 5/00808 | 235/440 |
| 2016/0042210 A1* | 2/2016 | Hiraiwa | G06K 7/10356 | 235/439 |
| 2017/0103620 A1* | 4/2017 | Vankirk | G07F 19/205 | |
| 2017/0132436 A1* | 5/2017 | Gomi | H05K 1/0275 | |
| 2017/0316288 A1* | 11/2017 | Aiyoshi | G06K 13/085 | |
| 2018/0218180 A1* | 8/2018 | Uchiyama | G06K 7/0056 | |
| 2018/0285604 A1* | 10/2018 | Miyazawa | H05K 1/0275 | |
| 2019/0005277 A1* | 1/2019 | Miyazawa | G06K 7/06 | |
| 2019/0118071 A1* | 4/2019 | Uchiyama | A63F 1/062 | |
| 2019/0275809 A1* | 9/2019 | Ohta | G07F 5/00808 | |
| 2022/0207249 A1* | 6/2022 | Miyazawa | G06K 13/08 | |
| 2023/0025650 A1* | 1/2023 | Phillips | H01R 12/721 | |
| 2023/0117057 A1* | 4/2023 | Uchiyama | G06K 7/1404 | 235/380 |

* cited by examiner

CARD PROCESSING DEVICE AND COVER MEMBER

CROSS REFERENCE TO RELATED APPLICATION

The present invention claims priority under 35 U.S.C. § 119 to Japanese Application No. 2021-170377 filed Oct. 18, 2021, the entire content of which is incorporated herein by reference.

TECHNICAL FIELD

At least an embodiment of the present invention may relate to a card processing device in which at least reading of information recorded on a card is performed and a cover member which is used in the card processing device.

BACKGROUND

In Japanese Patent Laid-Open No. 2015-161991 (Patent Literature 1), a card issue device is described which includes a card reader structured to perform reading of information recorded on a card and recording of information to a card, a card sending-out mechanism structured to send out a card before issue toward the card reader, and a card collection part for collecting an unnecessary card.

Various information recording means such as a bar-code, a two-dimensional cord, an integrated circuit ("IC") chip and a magnetic stripe are provided on a card. A bar-code and a two-dimensional cord are structured to be optically read. In a case that a plurality of information recording parts which are optically readable is provided in a card, there is a case that only one information of the plurality of information recording parts is desired to read. For example, it is conceivable that image data obtained by photographing an entire card with a camera are processed to read out information from one of the information recording parts. However, in this method, complicated processing by software is required.

SUMMARY

In view of the problem described above, at least an embodiment of the present invention may advantageously provide a card processing device capable of efficiently reading necessary information and a cover member which is used by attaching to the card processing device.

According to at least an embodiment of the present invention, there may be provided a card processing device structured to process a card having a plurality of information recording parts from which information is capable of being optically read. The card processing device includes a placing part which is formed with a placing face on which the card is placed, a reading part which is provided on an upper side with respect to the placing face and is capable of reading information from the information recording part, and an attaching part for detachably attaching a cover member which covers at least one information recording part of a plurality of information recording parts provided on the card which is placed on the placing face.

Further, according to at least an embodiment of the present invention, there may be provided a cover member having an attached part which is capable of being attached to the attaching part of the card processing device.

Effects of the Invention

According to at least an embodiment of the present invention, a card processing device capable of efficiently reading necessary information and a cover member which is attached and used in the card processing device are provided.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and where like elements are numbered alike in several Figures, in which.

DETAILED DESCRIPTION

A card issue device 1 will be described below which is an example of a card processing device in accordance with an embodiment of the present invention. A card processing device in accordance with the present invention is not limited to a card issue device having a card issue function, but it can be applied to a card reader in which a card is inserted to perform reading of information.

(Schematic Structure of Card Issue Device)

Figure 1:
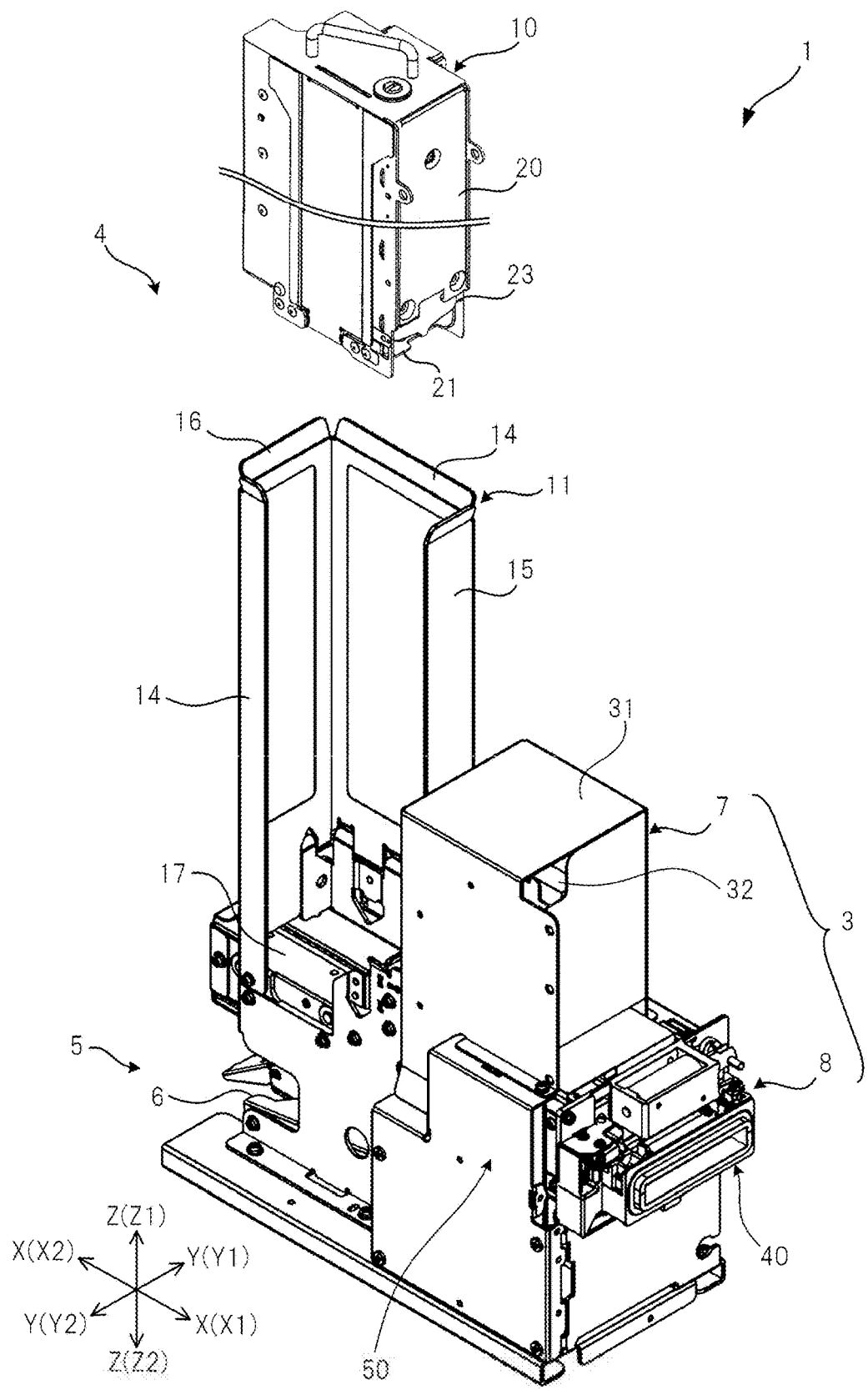
FIG. 1 is a perspective view showing a schematic structure of a card issue device 1.
Figure 2:
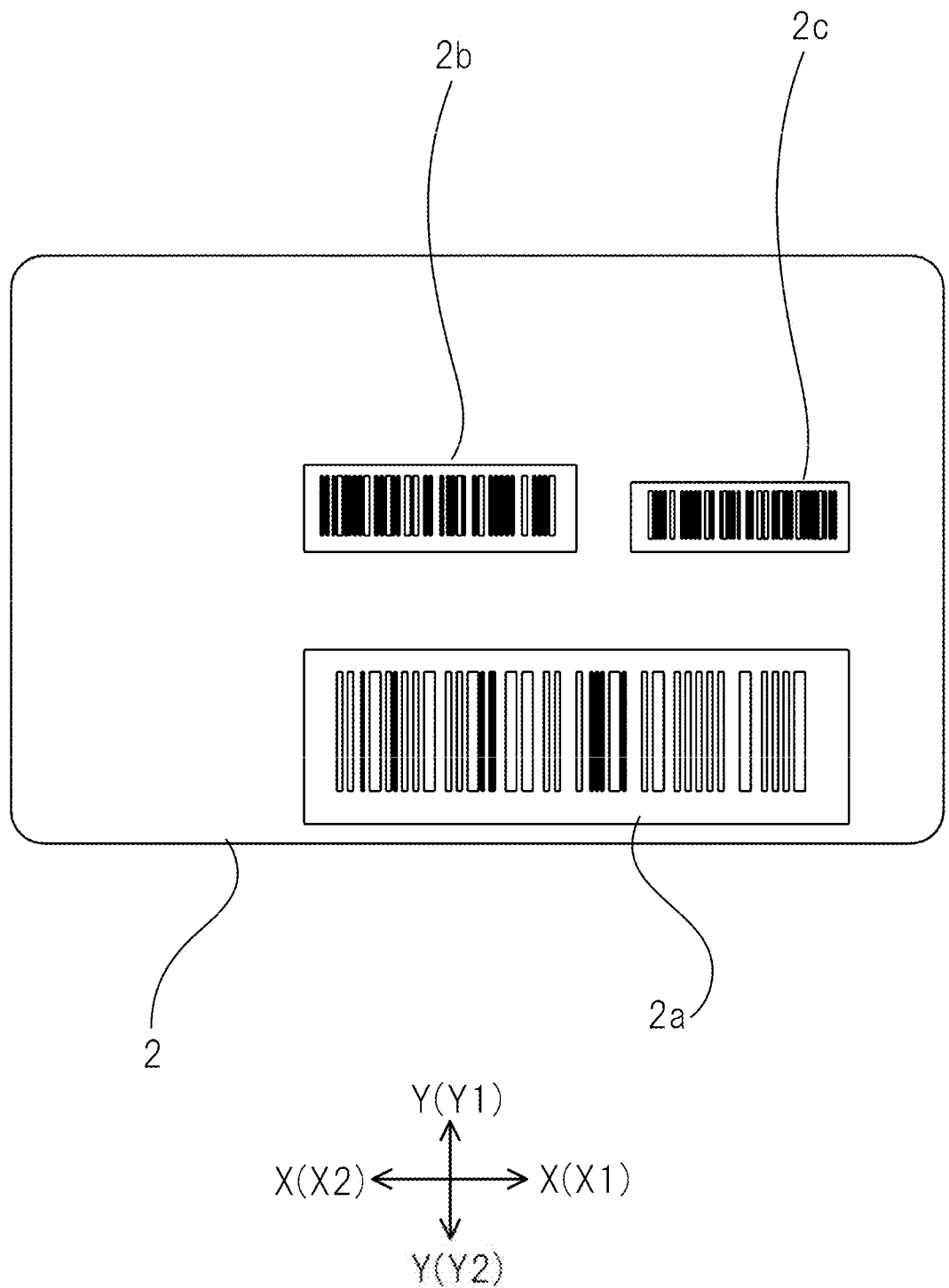
FIG. 2 is a plan view showing an example of a card 2 which is a processing object in the card issue device 1.

FIG. 1 is a perspective view showing a schematic structure of a card issue device 1. FIG. 2 is a plan view showing an example of a card 2 which is a processing object in the card issue device 1.

A card issue device 1 includes a card reader 3 which performs at least reading of information with regard to reading of information recorded on a card 2 and recording of information to a card 2, a card sending-out mechanism 4 structured to send out a card 2 before issue toward the card reader 3, and a card collection part 5 for collecting an unnecessary card 2. A card 2 is, for example, a card in a rectangular shape made of vinyl chloride whose thickness is about 0.7-0.8 mm. The card 2 is, as shown in FIG. 2, provided with three codes, i.e., a bar-code 2a, a bar-code 2b and a bar-code 2c as a plurality of information recording parts which are capable of being optically read. One of the bar-code 2a, the bar-code 2b and the bar-code 2c (for example, the bar-code 2c) may be omitted. Further, one of the bar-code 2a, the bar-code 2b and the bar-code 2c may be substituted with a two-dimensional cord. In addition to the above-mentioned information recording parts, a card 2 may be provided with a magnetic stripe in which magnetic data are recorded and an IC chip.

In the following descriptions, three directions perpendicular to each other are defined as an "X" direction, a "Y" direction and a "Z" direction. In this embodiment, the "Z" direction is coincided with a vertical direction and thus, the "Z" direction is referred to as an upper and lower direction, and a "Z1" direction side is an "upper" side and a "Z2" direction side is a "lower" side. Further, the "Y" direction is set to be a right and left direction, and a "Y1" direction side is a "right" side and a "Y2" direction side is a "left" side. Further, the "X" direction is set to be a front and rear direction, and an "X1" direction side is a "front" side and an "X2" direction side is a "back" (rear) side. Further, in this embodiment, the "Z" direction is coincided with a thickness direction of a card 2 accommodated in a card cassette 10 described below which structures the card sending-out mechanism 4. Further, the "Y" direction is coincided with a width direction (shorter direction) of a card 2 accommodated in the card cassette 10. Further, the "X" direction is coincided with a longitudinal direction (longer direction) of a card 2 accommodated in the card cassette 10. Cards 2 are accommodated in the card cassette 10 in a state that their faces provided with information recording parts shown in FIG. 2 face an upper side.

The card reader 3 structures a front side portion of the card issue device 1. The card reader 3 includes a reader part 7 including a scanner 32, which is capable of reading information from information recording parts of a card 2, and a conveyance part 8 which is capable of conveying a card 2 to a reading position and ejecting it to the outside. The conveyance part 8 is structured of a card ejection part 40 provided on a front side and a card conveying and holding part 50 provided on a rear side. The card conveying and holding part 50 and the card ejection part 40 are formed with a card conveyance passage "TP" (see FIG. 10) where a card 2 is conveyed. The card reader 3 reads information of a card 2 which is sent out by the card sending-out mechanism 4 and, after having confirmed whether there is any error in the read information or not, the card 2 is ejected from the card ejection part 40. When the card 2 is ejected from the card ejection part 40, issue of the card 2 in the card issue device 1 is finished.

The card sending-out mechanism 4 and the card collection part 5 structure a rear side portion of the card issue device 1. Further, the card sending-out mechanism 4 and the card collection part 5 are overlapped with each other in the upper and lower direction. Specifically, the card sending-out mechanism 4 is disposed on an upper side, and the card collection part 5 is disposed on a lower side. The card collection part 5 includes a reject stacker 6 for accommodating an unnecessary card 2 to be collected. The reject stacker 6 accommodates an unnecessary card 2 which is ejected from a rear face of the card reader 3. Next, a specific structure of the card sending-out mechanism 4 will be described below.

(Structure of Card Sending-Out Mechanism)

Figure 3:
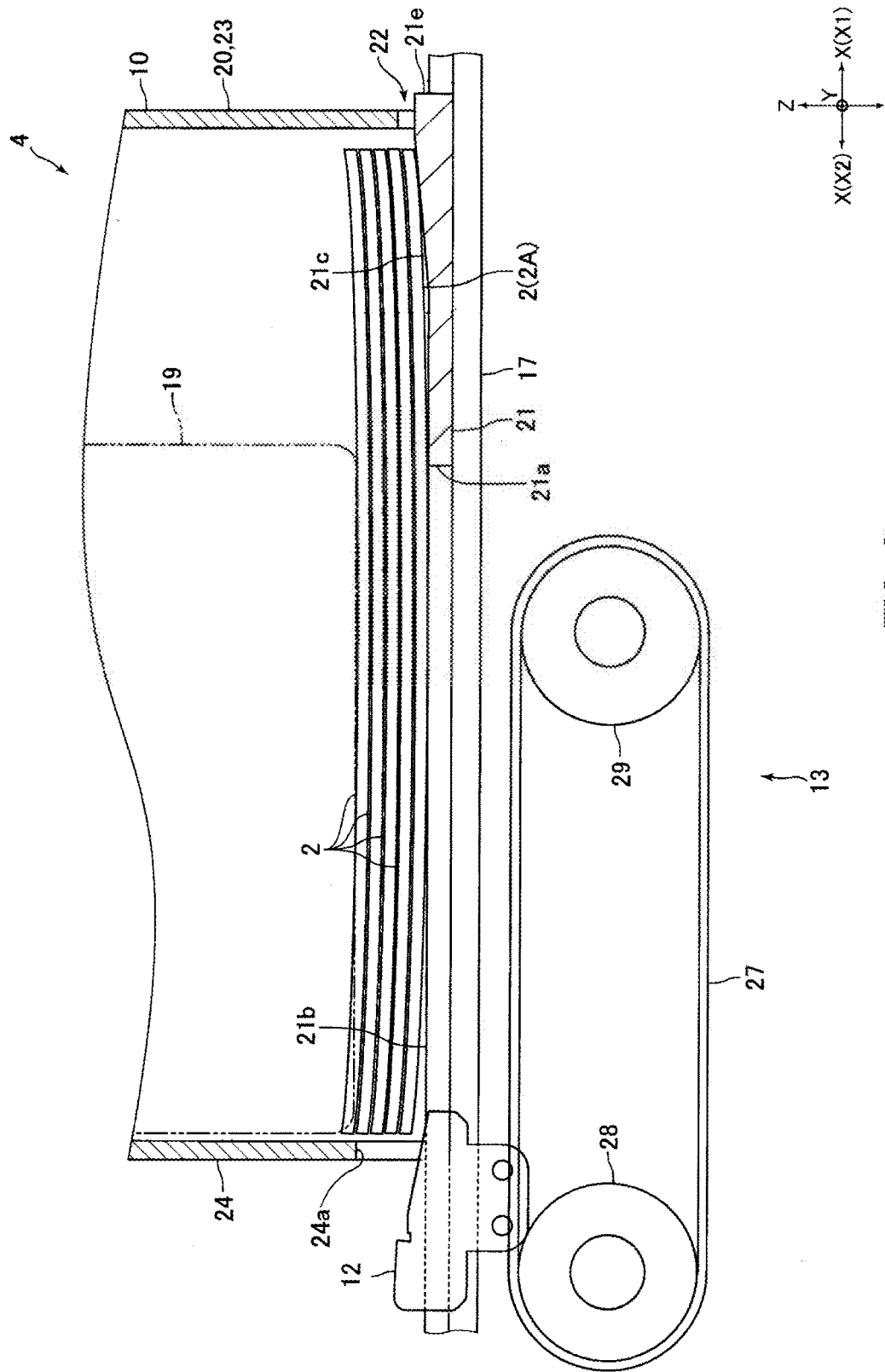
FIG. 3 is an explanatory side view showing a schematic structure of a lower end side portion in a card sending-out mechanism 4 shown in FIG. 1.

FIG. 3 is an explanatory side view showing a schematic structure of a lower end side portion in the card sending-out mechanism 4 shown in FIG. 1.

The card sending-out mechanism 4 includes a card cassette 10 in which a plurality of cards 2 before issue is laminated and accommodated, an accommodation part main body 11 (see FIG. 1) to which the card cassette 10 is detachably attached, a sending-out claw 12 which is structured to engage with a card 2 disposed at the lowest position (hereinafter, this card 2 is referred to as a "first card 2A" in a plurality of cards 2 accommodated in the card cassette 10 and send out the first card 2A to the outside of the card cassette 10, and a claw feed mechanism 13 structured to move the sending-out claw 12. In this embodiment, the first card 2A is sent out from the card cassette 10 to a front side ("X1" direction side) by the sending-out claw 12. In other words, the front side is a sending-out direction of the first card 2A.

The accommodation part main body 11 is, as shown in FIG. 1, structured of right and left side wall parts 14, a front wall part 15, a rear wall part 16 and a bottom face part 17, and the accommodation part main body 11 is formed in a box shape whose an upper face and a part of the side face are opened. The card cassette 10 is placed on an upper face of the bottom face part 17 and is disposed in a space surrounded by the right and left side wall parts 14, the front wall part 15 and the rear wall part 16. The bottom face part 17 is formed with a passage groove where the sending-out claw 12 is capable of passing. The passage groove is formed so as to penetrate through the bottom face part 17 in the upper and lower direction and is formed in a long and narrow slit shape in the front and rear direction.

The card cassette 10 is formed in a substantially rectangular parallelepiped shape which is long and thin in the upper and lower direction and is formed in a hollow shape so that cards 2 can be accommodated in its inside. A plurality of cards 2 is accommodated in an inside of the card cassette 10 so that its longitudinal direction and the front and rear direction are coincided with each other, and its width direction and the right and left direction are coincided with each other. A weight 19 is placed on a plurality of cards 2 which are laminated and accommodated in the inside of the card cassette 10 (see FIG. 3). The weight 19 is attached to the card cassette 10 so as not to be detached from the card cassette 10. Further, the weight 19 is attached to the card cassette 10 so as to be capable of sliding in the upper and lower direction. Further, the weight 19 is disposed in an inside of the card cassette 10 so that a center of gravity of the weight 19 is located on a rear side with respect to a center of the card cassette 10 in the front and rear direction.

In a state that the card cassette 10 has been attached to the accommodation part main body 11, a gate 22 through which a first card 2A is capable of passing toward a front side is formed between a lower end of a cassette front face part 20 structuring a front face portion of the card cassette 10 and the cassette bottom face part 21 structuring a bottom face portion of the card cassette 10. In other words, a front end portion of the card cassette 10 is formed with the gate 22 through which a first card 2A is passed toward the outside of the card cassette 10. Specifically, the cassette front face part 20 is provided with a shutter member 23 which is movable in the upper and lower direction, and the gate 22 is formed between the shutter member 23 and the cassette bottom face part 21. A space in the upper and lower direction of the gate 22 is set so that only one card 2 is capable of passing but two cards 2 overlapped with each other are unable to pass.

In this embodiment, when the card cassette 10 is detached from the accommodation part main body 11, the shutter member 23 is locked in a state that the shutter member 23 has been moved downward and thus, a card 2 is unable to be taken out to a front side from the card cassette 10. In other words, when the card cassette 10 is detached from the accommodation part main body 11, the gate 22 is not formed. On the other hand, when the card cassette 10 is attached to the accommodation part main body 11, the shutter member 23 is moved to an upper side by an operation of a shutter opening member (not shown) provided in the front wall part 15 of the accommodation part main body 11 and the gate 22 is formed.

A lower end side of a cassette rear face part 24 structuring a rear face portion of the card cassette 10 is formed with an opening part 24a through which the sending-out claw 12 is capable of passing. The cassette bottom face part 21 is formed with a passage groove 21a through which the sending-out claw 12 is capable of passing. The passage groove 21a is formed so as to penetrate through the cassette bottom face part 21 in the upper and lower direction. Further, the passage groove 21a is formed at a substantially center in the right and left direction of the cassette bottom face part 21 and is formed in a slit shape which is narrow and long in the front and rear direction. An upper face of the cassette bottom face part 21 is formed to be a support face 21b which is contacted with a lower face of a first card 2A. The support face 21b is formed in a flat face shape which is parallel to a horizontal direction (in other words, which is perpendicular to the upper and lower direction).

A front side portion of the support face 21b is formed with an inclined face 21c which is inclined toward an upper side as going toward a front side. The inclined face 21c has a function which guides a front end of a first card 2A to the gate 22.

The claw feed mechanism 13 includes a chain 27 to which the sending-out claw 12 is fixed, a pair of sprockets 28 and 29 over which the chain 27 is extended, a motor (not shown) for driving the sending-out claw 12, and a pulley and a belt (not shown) for transmitting power of the motor to the sprocket 29. In accordance with an embodiment of the present invention, instead of using the chain 27 and the sprockets 28 and 29, the claw feed mechanism 13 may include a belt and pulleys.

The chain 27 and the sprockets 28 and 29 are disposed on a lower side with respect to the bottom face part 17. Further, the chain 27 and the sprockets 28 and 29 are disposed at a substantially center position in the right and left direction of the card cassette 10. In other words, the sending-out claw 12 which is fixed to the chain 27 is disposed at a substantially center position of the card cassette 10 in the right and left direction. Further, the sprocket 28 is disposed on a rear side with respect to the cassette rear face part 24, and the sprocket 29 is disposed at a substantially center position of the card cassette 10 in the front and rear direction. Further, the sprocket 28 and the sprocket 29 are disposed at the same height as each other.

When the sprockets 28 and 29 are rotated, the sending-out claw 12 is reciprocated between the sprockets 28 and 29 in the front and rear direction. In this embodiment, when the sprockets 28 and 29 are rotated in a clockwise direction in FIG. 3 and the sending-out claw 12 is moved from the sprocket 28 toward the sprocket 29, an upper end side of the sending-out claw 12 passes an upper side with respect to the support face 21b of the card cassette 10. When the upper end side of the sending-out claw 12 passes an upper side with respect to the support face 21b, the sending-out claw 12 is abutted with a rear end of a first card 2A to send the first card 2A to a front side. Further, when the sending-out claw 12 is moved from the sprocket 29 toward the sprocket 28, the sending-out claw 12 passes a lower side with respect to the sprockets 28 and 29.

(Detailed Structure of Card Reader)

Figure 4:
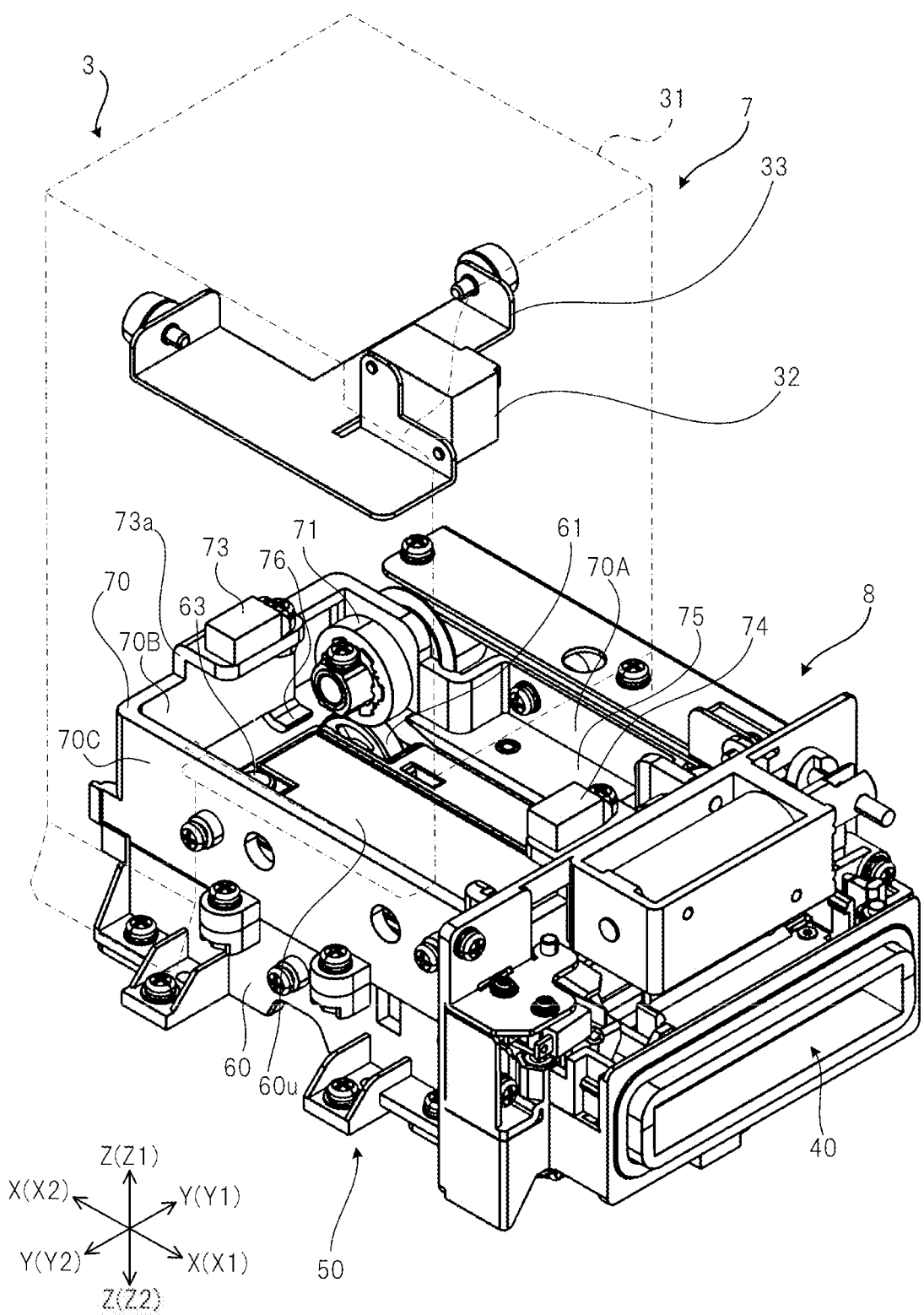
FIG. 4 is a perspective view showing a card reader 3.
Figure 5:
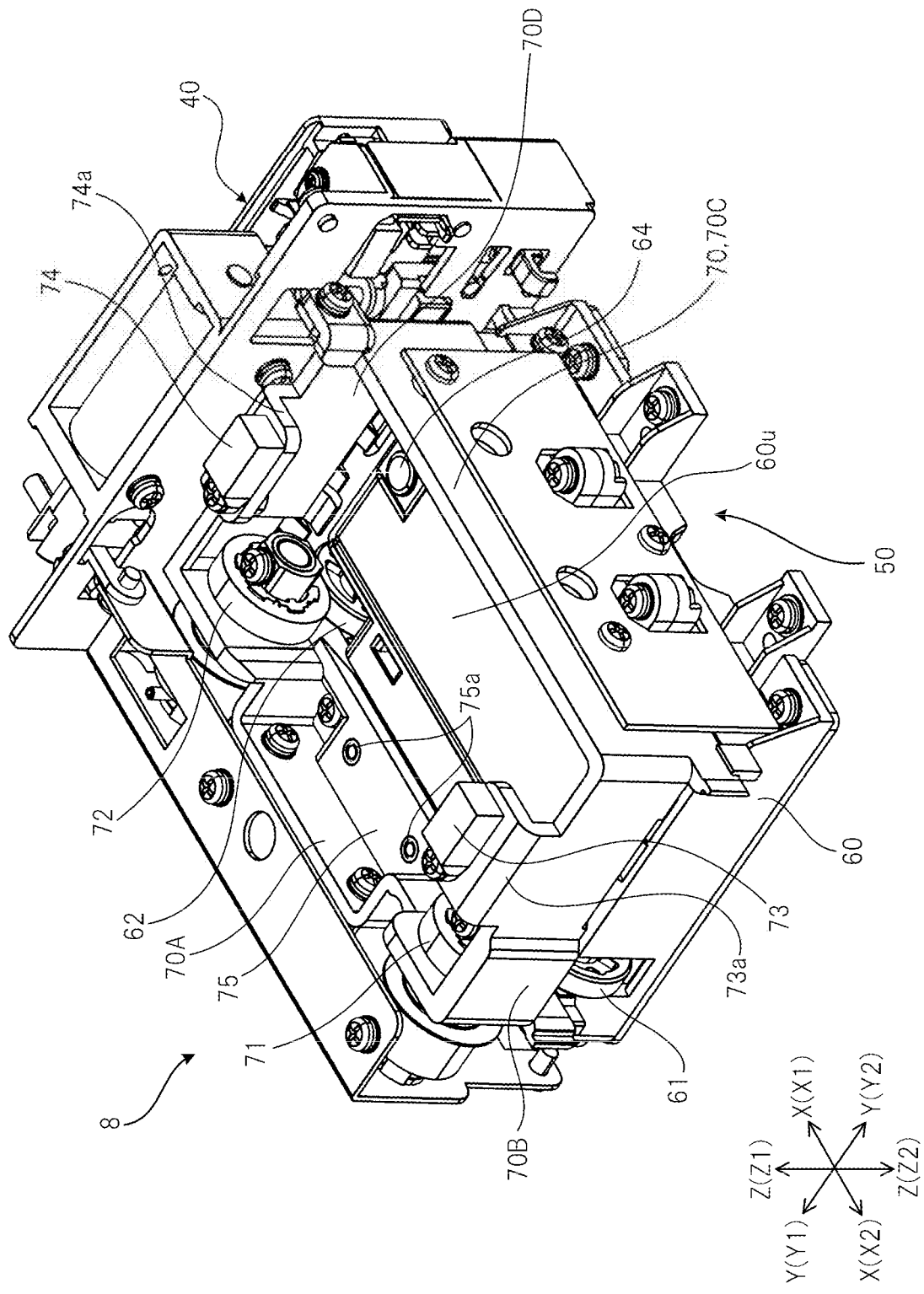
FIG. 5 is a perspective view showing a conveyance part 8 of the card reader 3 shown in FIG. 4 which is viewed in another direction.
Figure 6:
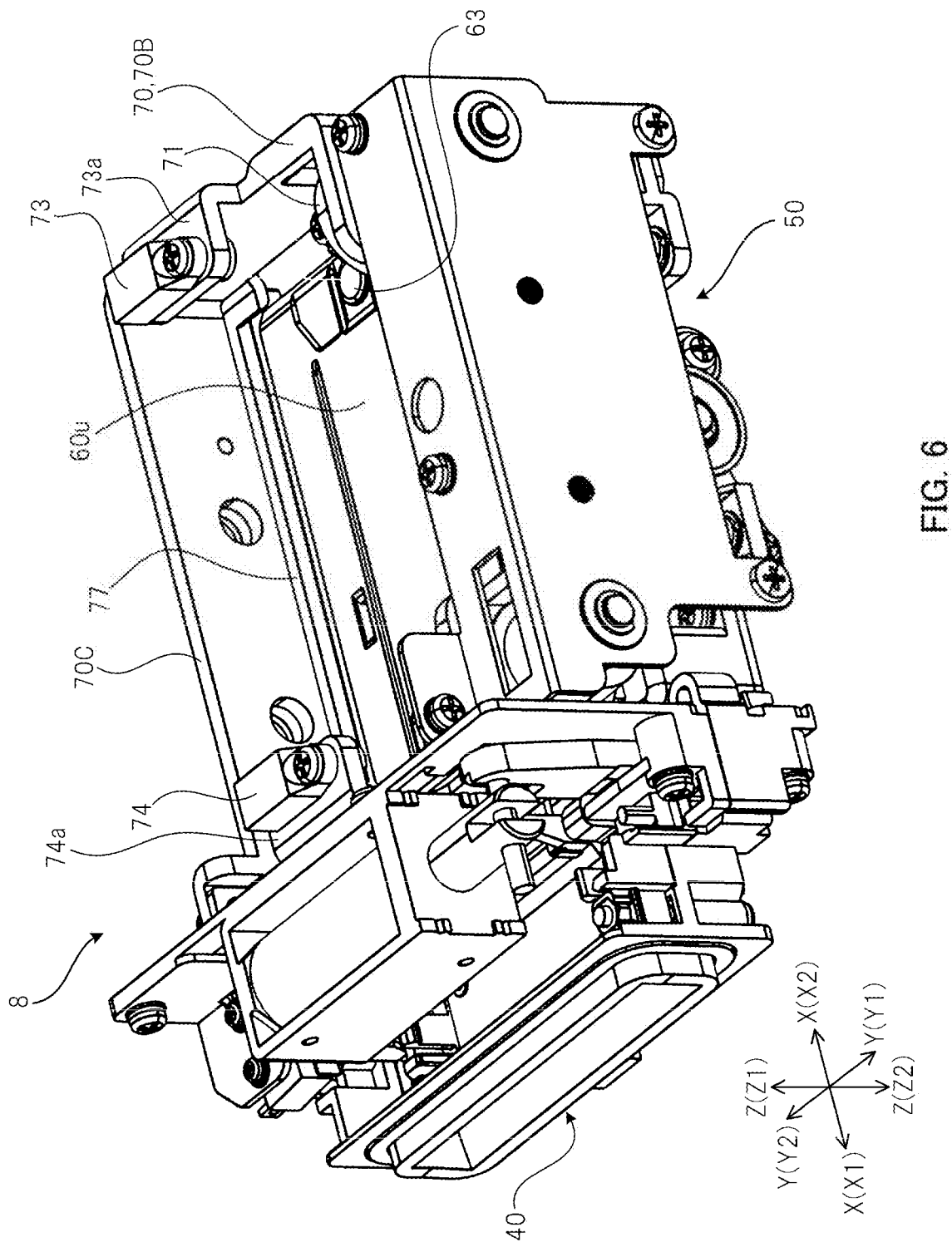
FIG. 6 is a perspective view showing the conveyance part 8 in FIG. 5 which is viewed in another direction.
Figure 7:
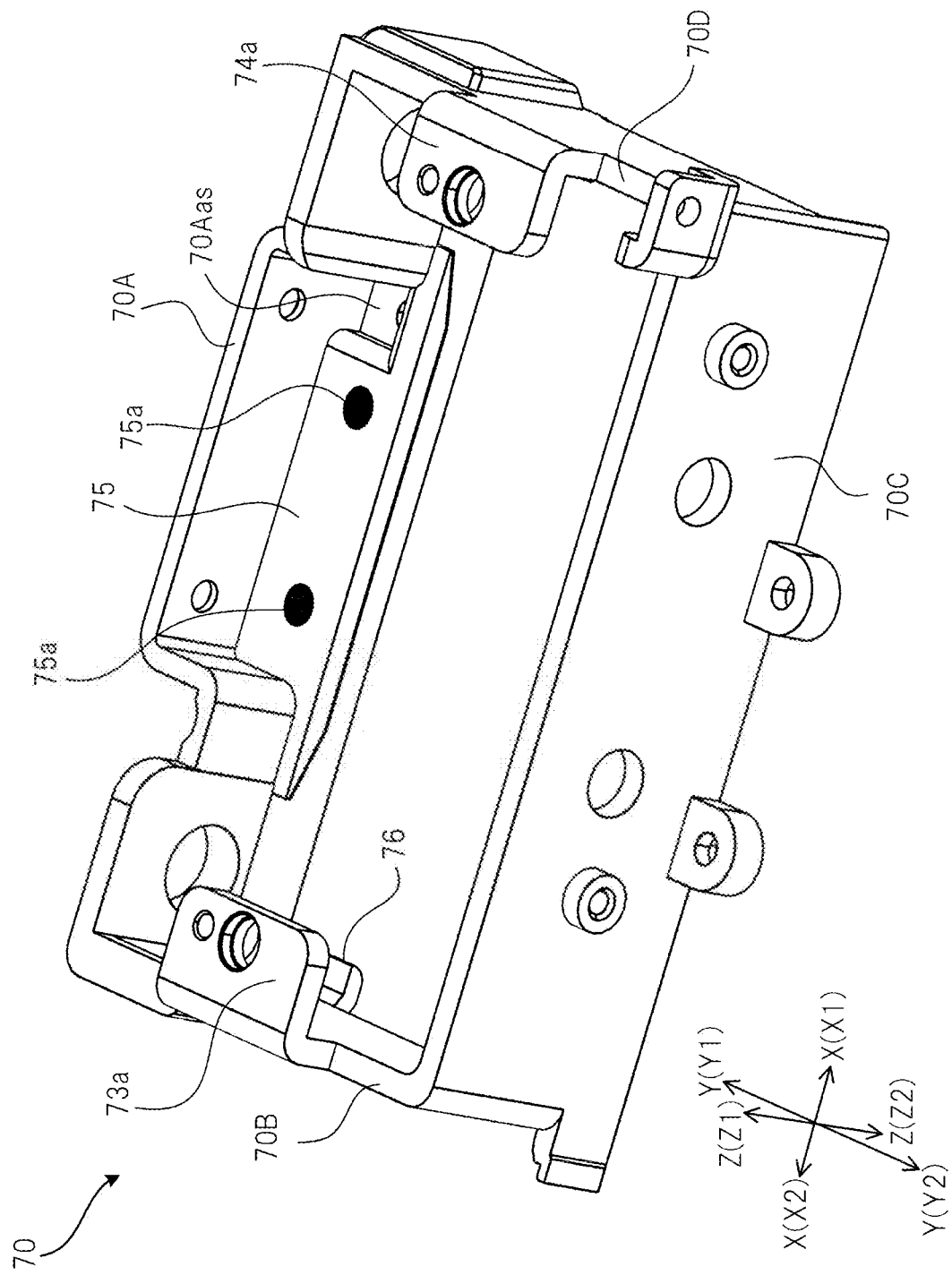
FIG. 7 is a perspective view showing a section forming member 70 in the conveyance part 8 shown in FIG. 5.
Figure 8:
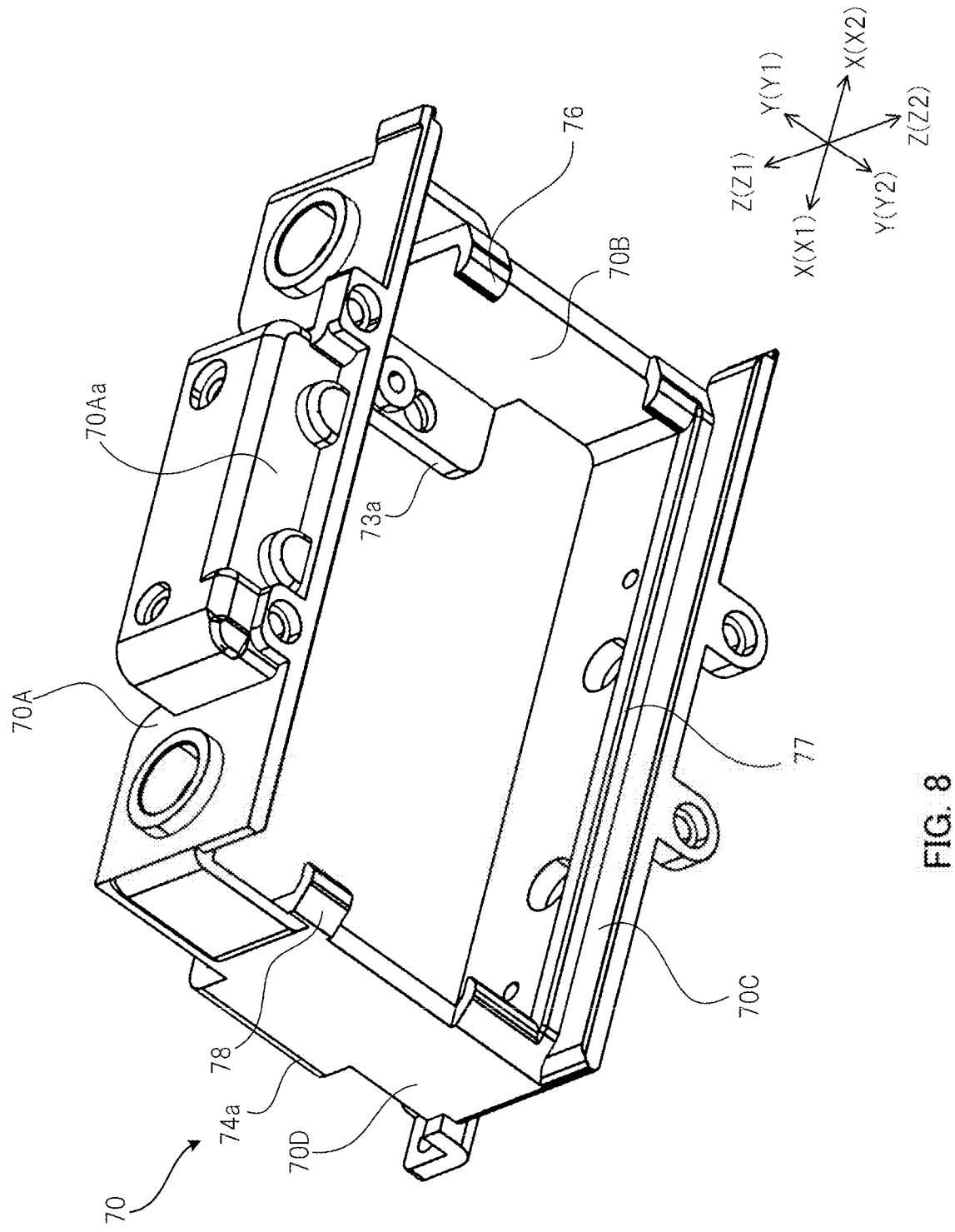
FIG. 8 is a perspective view showing the section forming member 70 in FIG. 7 which is viewed in another direction.
Figure 9:
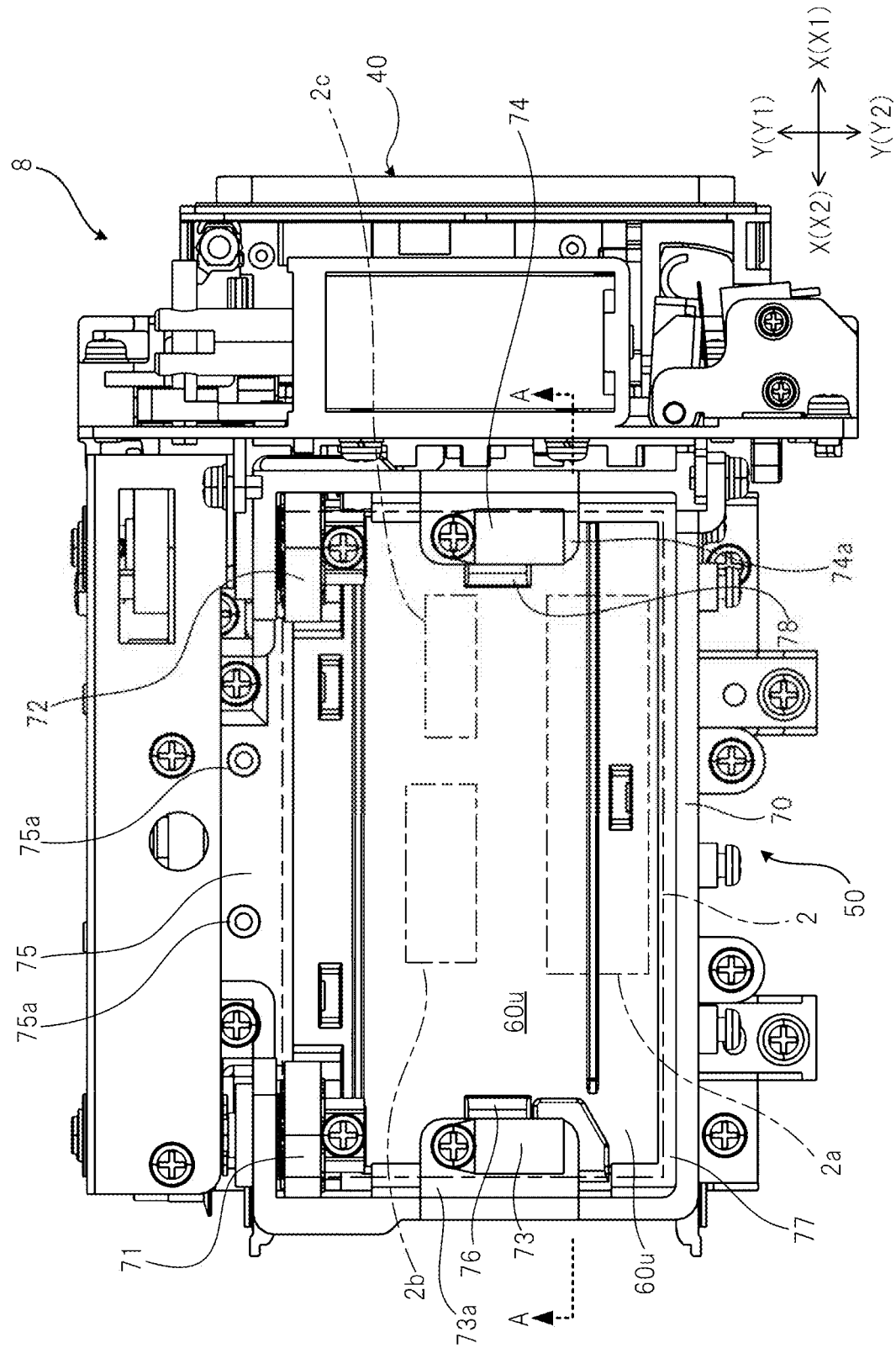
FIG. 9 is a plan view showing the conveyance part 8 in FIG. 5 which is viewed to the "Z2" direction.
Figure 10:
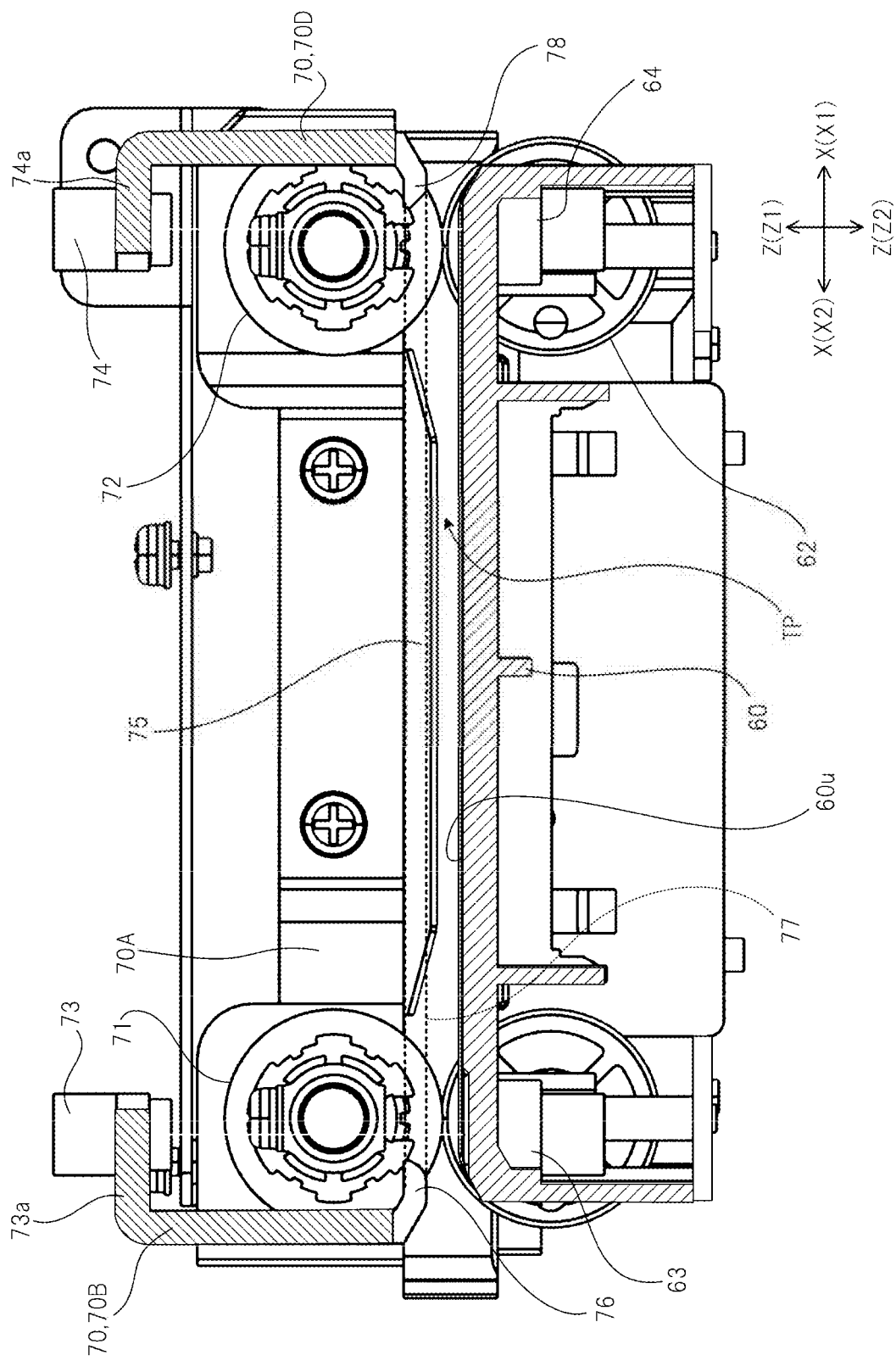
FIG. 10 is a cross-sectional view showing the conveyance part 8 which is cut by the "A-A" line in FIG. 9.

FIG. 4 is a perspective view showing the card reader 3. FIG. 5 is a perspective view showing the conveyance part 8 of the card reader 3 in FIG. 4 which is viewed in another direction. FIG. 6 is a perspective view showing the conveyance part 8 in FIG. 5 which is viewed in another direction. FIG. 7 is a perspective view showing a section forming member 70 in the conveyance part 8 shown in FIG. 5. FIG. 8 is a perspective view showing the section forming member 70 in FIG. 7 which is viewed in another direction. FIG. 9 is a plan view showing the conveyance part 8 in FIG. 5 which is viewed to the "Z2" direction. FIG. 10 is a cross-sectional view showing the conveyance part 8 which is cut by the "A-A" line in FIG. 9.

As shown in FIG. 4, the reader part 7 includes a scanner 32, a support member 33 which supports the scanner 32, and an accommodation part 31 in a box shape whose lower face side is opened and which supports the support member 33. The scanner 32 is disposed on an upper end part side of the accommodation part 31. The scanner 32 is provided for reading a bar-code shown in FIG. 2 or a two-dimensional code, and a bar-code scanner or a camera is used.

As shown in FIGS. 4 through 6 and FIG. 10, the card conveying and holding part 50 includes a case 60 in a box shape which structures its lower side portion and a section forming member 70 in a rectangular frame shape which is disposed on an upper side with respect to the case 60. As shown in FIGS. 7 and 8, the section forming member 70 is provided with a right wall part 70A which is disposed on a right side and extended in the front and rear direction, a rear wall part 70B extended to the left direction from a rear end of the right wall part 70A, a left wall part 70C extended to the front direction from a left end of the rear wall part 70B, and a front wall part 70D which is extended in the right and left direction from a front end of the left wall part 70C toward a front end of the right wall part 70A. Lower ends of the front wall part 70D and the rear wall part 70B are located on an upper side with respect to lower ends of the right wall part 70A and the left wall part 70C. The lower ends of the right wall part 70A and the left wall part 70C are close to or contacted with an upper face 60u of the case 60. On the other hand, spaces exist between lower ends of the front wall part 70D and the rear wall part 70B and the upper face 60u of the case 60. The scanner 32 of the reader part 7 is disposed on an upper side with respect to the section forming member 70. At least a part of a region (hereinafter, referred to as a partitioned region) surrounded by the right wall part 70A, the rear wall part 70B, the left wall part 70C and the front wall part 70D when viewed in the upper and lower direction is set to be a readable region (an irradiation possible range of infrared radiation in a case of a scanner 32 which irradiates infrared radiation, or an imaging range when the scanner 32 is a camera).

As shown in FIG. 8, a right end part at a lower end of the rear wall part 70B is formed with a protruded part 76 which is protruded toward the front wall part 70D. Further, a right end part at a lower end of the front wall part 70D is formed with a protruded part 78 which is protruded toward the rear wall part 70B at the same position as the protruded part 76 in the right and left direction. Further, a lower end part of the left wall part 70C is formed with a protruded part 77 in a straight line shape which is protruded toward the right wall part 70A and is extended from a front end of the left wall part 70C to its rear end.

As shown in FIG. 7, the right wall part 70A is formed in a shape which is partially protruded to the right direction at a substantially center in the front and rear direction and on an upper end side. A lower end of the protruded portion and a lower end part of the right wall part 70A at a substantially center in the front and rear direction are connected with each other through a flat part 70Aa (see FIG. 8). An upper face 70Aas (see FIG. 7) of the flat part 70Aa is attached with an attaching part 75 for detachably attaching a cover member (cover members 51 and 52) described below. The attaching part 75 is a plate-shaped member formed in a substantially "T"-shape in a plan view. The attaching part 75 is formed with two through-holes 75a penetrating through in the upper and lower direction side by side in the front and rear direction. As shown in FIG. 7, an upper end of the front wall part 70D is formed with a protruded part 74a in a substantially "L"-shape which is protruded toward the rear wall part 70B. Further, an upper end of the rear wall part 70B is formed with a protruded part 73a in a substantially "L"-shape which is protruded toward the front wall part 70D. As shown in FIG. 9, a tip end of the protruded part 73a is located on a rear side with respect to a tip end of the protruded part 76. Further, a tip end of the protruded part 74a is located on a front side with respect to a tip end of the protruded part 78. As shown in FIG. 10, positions in the upper and lower direction of respective upper faces of the attaching part 75, the protruded part 76, the protruded part 77 and the protruded part 78 are the same as each other.

An upper face 60u of the case 60 is structured to be a placing face on which a card 2 is placed. As described above, a space is formed between the upper face 60u of the case 60 and the front wall part 70D and the rear wall part 70B of the section forming member 70, and the space structures a part of the card conveyance passage "TP". A card 2 which is sent by the sending-out claw 12 is inserted into the partitioned region through a space between the rear wall part 70B of the section forming member 70 and the case 60 by driving a conveyance roller 71 and a conveyance roller 72 described below, and the card 2 is placed on the upper face 60u of the case 60 which is overlapped with the partitioned region in the upper and lower direction.

The card 2 after information has been read by the scanner 32 is conveyed from the upper face 60u to the front side by driving the conveyance roller 71 and the conveyance roller 72, and the card 2 is conveyed to the card ejection part 40 through a space between the front wall part 70D of the section forming member 70 and the case 60.

As shown in FIGS. 4 and 5, the card conveying and holding part 50 further includes a first position detection element structured of a pair of an optical element 73 and an optical element 63, a second position detection element structured of a pair of an optical element 74 and an optical element 64, the conveyance roller 71, a pad roller 61 facing the conveyance roller 71, the conveyance roller 72, and a pad roller 62 facing the conveyance roller 72 in the partitioned region when viewed in the upper and lower direction. As shown in FIG. 9, the conveyance roller 71 and the pad roller 61 are disposed at a corner part on a right rear side of the partitioned region. Further, the conveyance roller 72 and the pad roller 62 are disposed at a corner part on a right front side of the partitioned region.

As shown in FIG. 6, the optical element 73 is fixed to an upper face of the protruded part 73a of the rear wall part 70B. The optical element 63 is disposed so as to face the optical element 73 in the upper and lower direction and is provided on an inner side of the case 60 in a state that its upper face is exposed to the optical element 73 side. The optical element 73 is one of a light emitting element and a light receiving element, and the optical element 63 is the other of the light emitting element and the light receiving element.

As shown in FIG. 5, the optical element 74 is fixed to an upper face of the protruded part 74a of the front wall part 70D. The optical element 64 is disposed so as to face the optical element 74 in the upper and lower direction and is provided on an inner side of the case 60 in a state that its upper face is exposed to the optical element 74 side. The optical element 74 is one of a light emitting element and a light receiving element, and the optical element 64 is the other of the light emitting element and the light receiving element.

(Structure of Cover Member.)

The card reader 3 of the card issue device 1 is structured so that a plate-shaped cover member is detachably provided. The cover member is used for limiting the number of information recording parts to one recording part which is a reading object of the scanner 32 in a card 2 that is held in the card conveying and holding part 50. The cover member is capable of being attached to the attaching part 75 of the section forming member 70 in the card conveying and holding part 50. The cover member is disposed between a card 2 placed on the upper face 60u of the case 60 in the partitioned region and the scanner 32 in a state that the cover member is attached to the attaching part 75.

Figure 11:
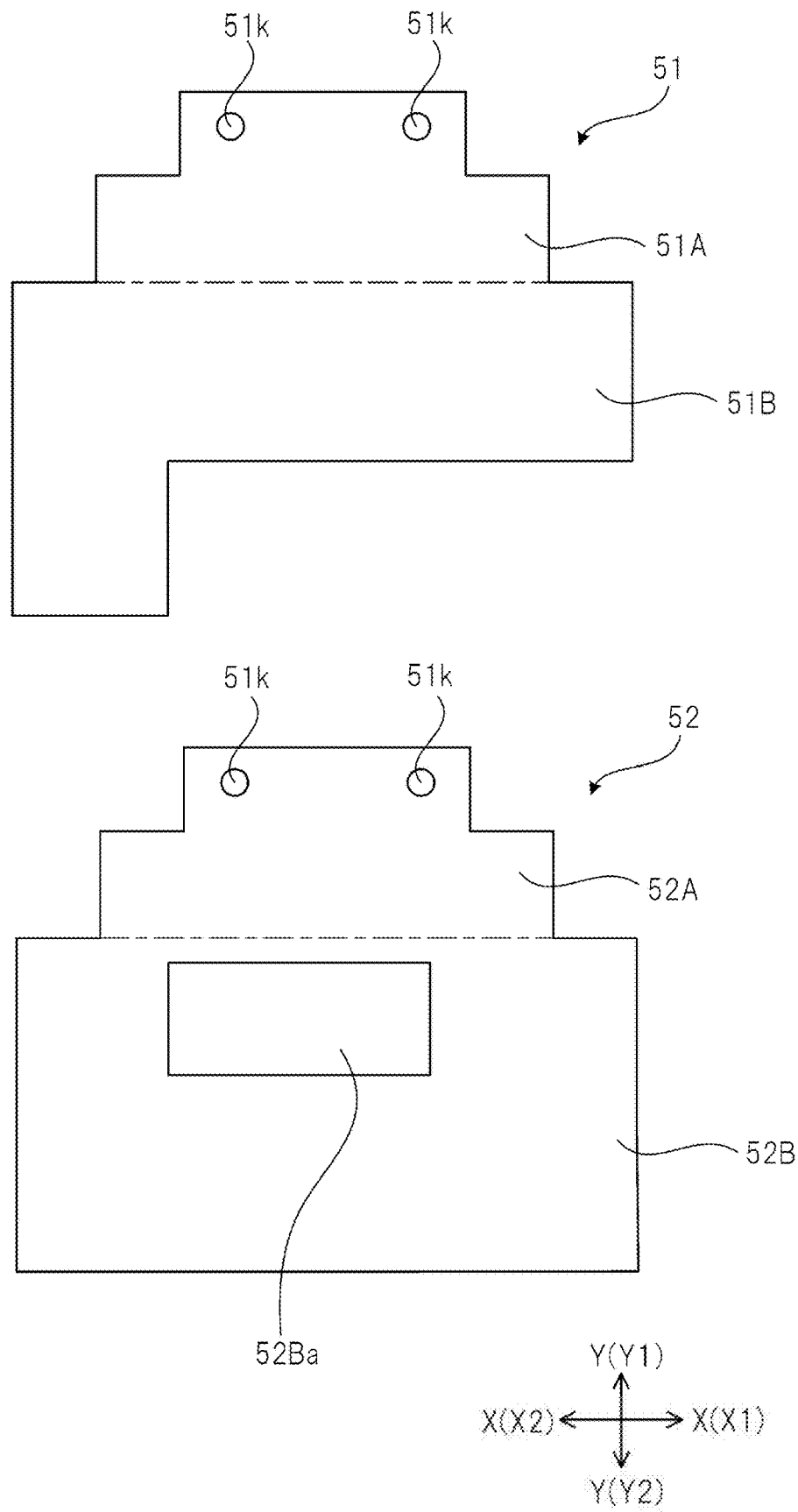
FIG. 11 is a schematic view showing examples of a cover member.

FIG. 11 is a schematic view showing examples of a cover member. FIG. 11 shows a cover member 51 and a cover member 52 having different shapes. The cover member 51 and the cover member 52 are respectively shown in FIG. 11 with a state that they are attached to the card reader 3. The cover member 51 and the cover member 52 are respectively formed in a plate shape whose thickness direction is coincided with the upper and lower direction.

The cover member 51 is structured of a common part 51A in a shape protruded to the right side and a specific part 51B in an "L"-shape which is connected with a left end of the common part 51A. The common part 51A is formed with two through-holes 51k side by side in the front and rear direction so as to penetrate through in a thickness direction The cover member 52 is structured of a common part 52A having the same structure as the common part 51A and a specific part 52B in a rectangular shape which is connected with a left end of the common part 52A. The specific part 52B is formed with an opening 52Ba which penetrates through in a thickness direction.

(Structure of Card Conveying and Holding Part Attached with Cover Member)

Figure 12:
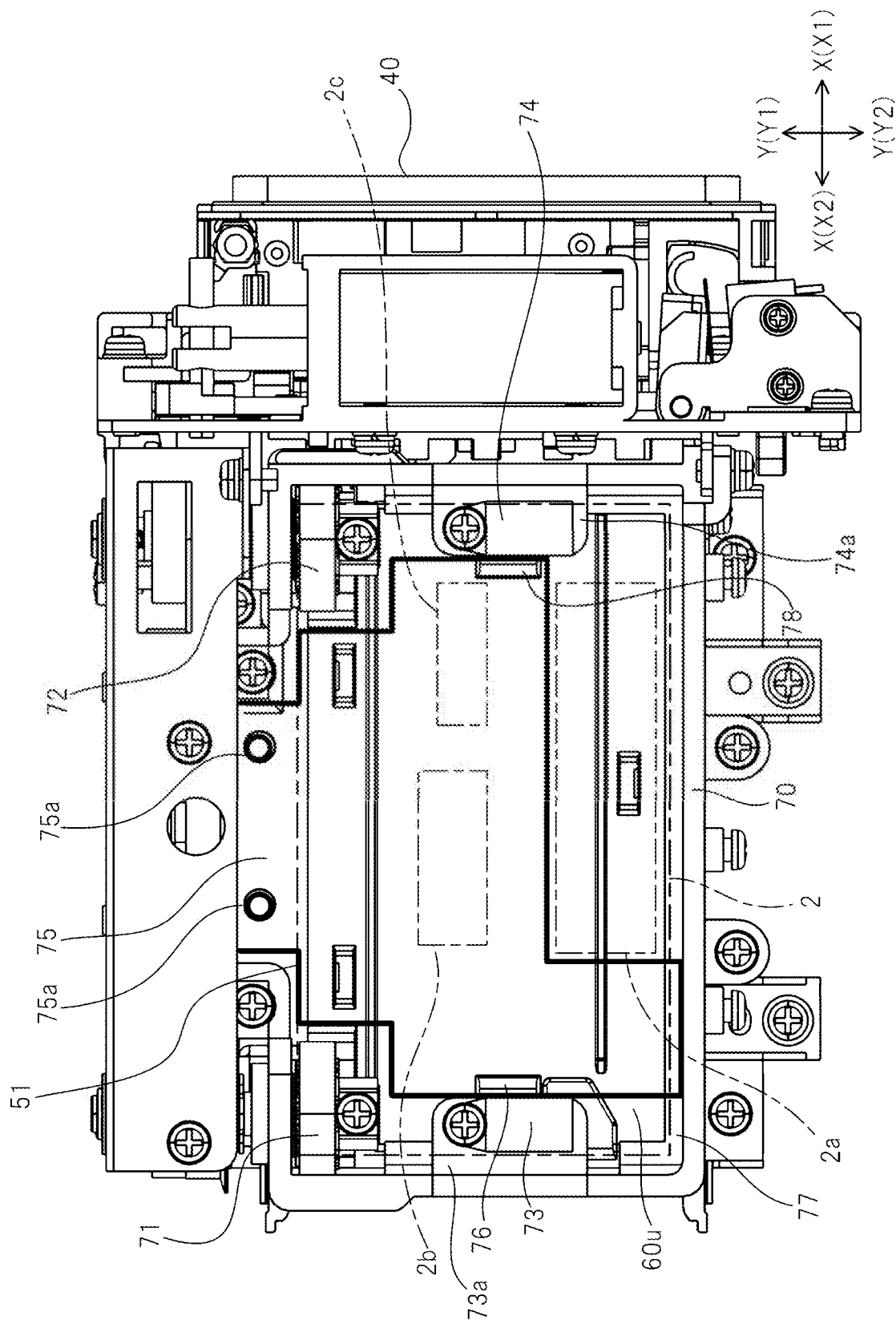
FIG. 12 is a plan view showing a card conveying and holding part 50 in a state that a cover member 51 is attached to an attaching part 75.

FIG. 12 is a plan view showing the card conveying and holding part 50 in a state that the cover member 51 is attached to the attaching part 75. In FIG. 12, only an edge line of the cover member 51 is indicated. When the through-hole 75a on a front side formed in the attaching part 75 and the through-hole 51k on a front side formed in the cover member 51 are overlapped with each other and a bolt is passed through these two through-holes, and the through-hole 75a on a rear side formed in the attaching part 75 and the through-hole 51k on a rear side formed in the cover member 51 are overlapped with each other and a bolt is passed through these two through-holes and then, these bolts are fastened. As a result, the cover member 51 is attached to the attaching part 75.

As shown in FIG. 12, in a state that the cover member 51 has been attached, a left end of the cover member 51 is placed on an upper face of the protruded part 77 and thus, the left end of the cover member 51 is supported by the protruded part 77. Further, a part of a front end of the cover member 51 is placed on an upper face of the protruded part 78 and thus, the front end of the cover member 51 is supported by the protruded part 78. Further, a part of a rear end of the cover member 51 is placed on an upper face of the protruded part 76 and thus, the rear end of the cover member 51 is supported by the protruded part 76.

The specific part 51B of the cover member 51 is formed with a cut-out part for exposing a bar-code 2a at a left end on a front side. Therefore, a bar-code 2b and a bar-code 2c are covered by the specific part 51B of the cover member 51, but a bar-code 2a is exposed to a side of the scanner 32 without being covered by the specific part 51B of the cover member 51. As described above, in a state that the cover member 51 is attached, even when a card 2 is provided with a plurality of information recording parts, an information recording part which is a reading object of the scanner 32 is limited to one recording part.

Figure 13:
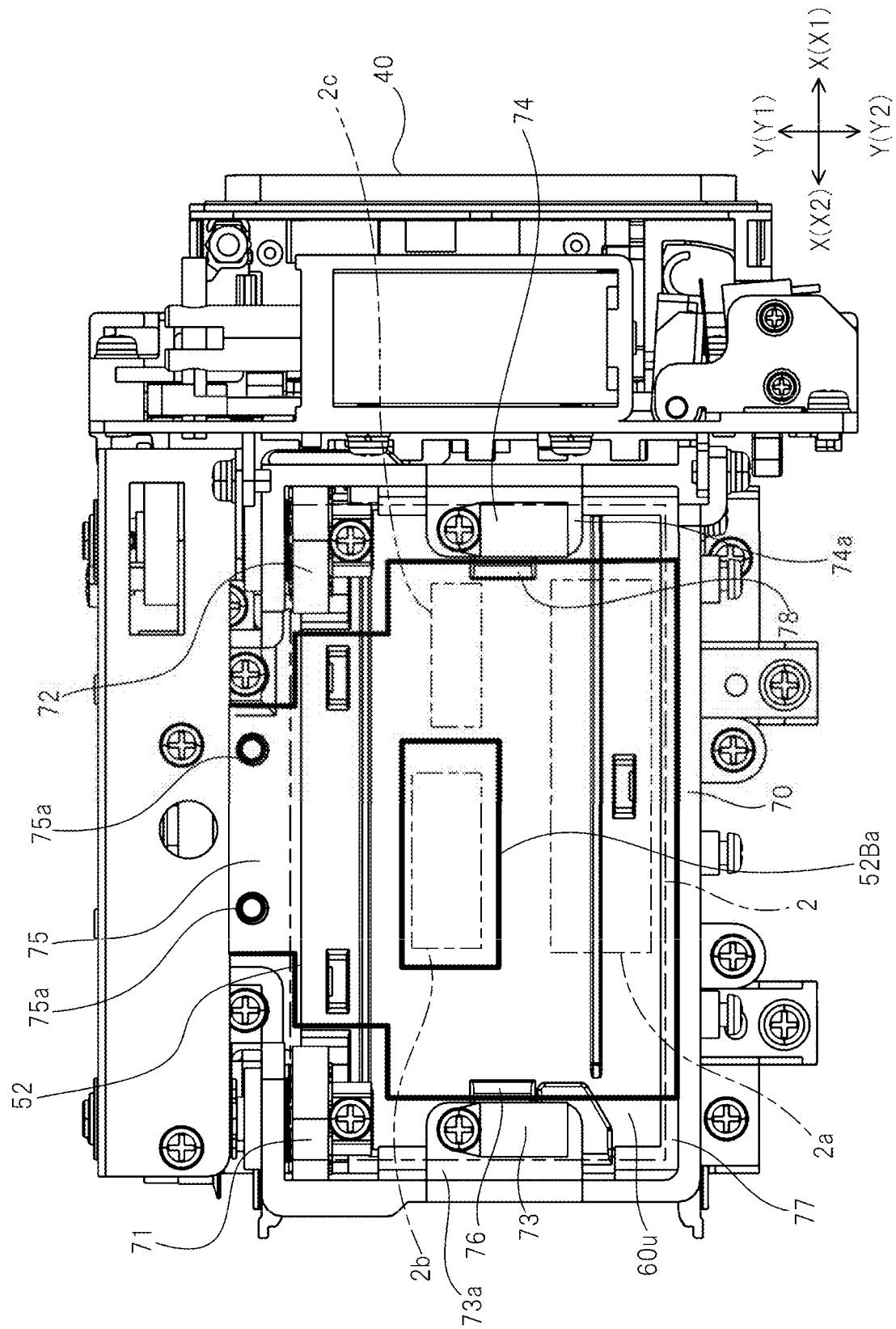
FIG. 13 is a plan view showing a card conveying and holding part 50 in a state that a cover member 52 is attached to an attaching part 75.

FIG. 13 is a plan view showing the card conveying and holding part 50 in a state that the cover member 52 is attached to the attaching part 75. In FIG. 13, only an edge line of the cover member 52 is indicated. As shown in FIG. 13, in a state that the cover member 52 is attached, a left end of the cover member 52 is placed on an upper face of the protruded part 77 and thus, the left end of the cover member 52 is supported by the protruded part 77. Further, a part of a front end of the cover member 52 is placed on an upper face of the protruded part 78 and thus, the front end of the cover member 52 is supported by the protruded part 78. Further, a part of a rear end of the cover member 52 is placed on an upper face of the protruded part 76 and thus, the rear end of the cover member 52 is supported by the protruded part 76.

The specific part 52B of the cover member 52 is formed with an opening 52Ba for exposing a bar-code 2b on a right end side and at a substantially center position. Therefore, a bar-code 2a and a bar-code 2c are covered by the specific part 51B of the cover member 52, but a bar-code 2b is exposed to a side of the scanner 32 through the opening 52Ba of the cover member 52. As described above, in a state that the cover member 52 is attached, even when a card 2 is provided with a plurality of information recording parts, an information recording part which is a reading object of the scanner 32 can be set to one recording part.

(Effects of Card Issue Device)

According to the card issue device 1, when the cover member 51 or 52 is attached to the attaching part 75, in a state that a card 2 is placed on the placing face 60u, only one of a plurality of information recording parts provided in the card 2 is exposed to a side of the scanner 32. As a result, even in a card 2 having a plurality of information recording parts, information can be read from only one information recording part by the scanner 32. Therefore, complicated processing in which information is read from a plurality of information recording parts by the scanner 32 and necessary information is selected from the entire information is not required and thus, necessary information can be efficiently read out. Further, the cover members 51 and 52 can be attached and detached and thus, in a case that information is required to be read from all of a plurality of information recording parts, when the cover members 51 and 52 are not attached to the attaching part 75, information can be read from all of a plurality of information recording parts. Further, when cover members corresponding to various types of a card 2 have been previously prepared, cards having various arrangements of information recording parts can be used. In addition, the cover members 51 and 52 are supported by the attaching part 75 and the protruded parts 76, 76 and 77 and thus, positions of the cover members 51 and 52 can be stabilized and only necessary information recording part can be exposed stably.

In the descriptions described above, the cover member is structured so that the number of information recording part which is a reading object of the scanner 32 in a card 2 held in the card conveying and holding part 50 is limited to one recording part. However, in a case that the number of information recording parts provided on a card 2 is three or more, the cover member may be structured so that the number of information recording parts which are reading objects of the scanner 32 in a card 2 held in the card conveying and holding part 50 may be limited to two or more recording parts. For example, a cover member may be formed so that, in a bar-code 2a, a bar-code 2b and a bar-code 2c of a card 2, the cover member covers only the bar-code 2a and exposes the bar-code 2b and the bar-code 2c. Also in this structure, reading of information of all the bar-codes is not required and thus, necessary information can be read efficiently.

As described above, the present specification discloses the following structures. Structure elements and the like corresponding to the embodiment described above are indicated in parentheses, but the present invention is not limited to these structure elements and the like.

(1) A card processing device (card issue device 1) structured to process a card (card 2) provided with a plurality of information recording parts (bar-code 2a, bar-code 2b and bar-code 2c) whose informations are capable of being optically read. The card processing device includes a placing part (case 60) which is formed with a placing face (upper face 60u) on which the card is placed, a reading part (scanner 32) which is provided on an upper side with respect to the placing face and is capable of reading information from the information recording parts, and an attaching part (attaching part 75) for detachably attaching a cover member (cover member 51 and cover member 52) which covers the information recording part that is a part of the plurality of information recording parts on the card placed on the placing face.

According to the card processing device described in the above-mentioned structure (1), when the cover member is attached to the attaching part, in a state that a card is placed on the placing face, only a part of a plurality of information recording parts provided on the card is exposed to a side of the reading part. As a result, even in a card provided with a plurality of information recording parts, information can be read from only a part of the information recording parts by the reading part. Therefore, complicated processing in which information is read from a plurality of information recording parts by the reading part and necessary information is selected from the entire information is not required and thus, the necessary information can be efficiently read out. Further, the cover member can be attached and detached and thus, in a case that information is required to be read from all of a plurality of information recording parts, when the cover member is not attached to the attaching part, information can be read from all of a plurality of information recording parts. In addition, when cover members corresponding to various types of a card have been previously prepared, cards having various arrangements of information recording parts can be used.

(2) The card processing device described in the above-mentioned structure (1) further includes at least one support part (protruded part 76, protruded part 77 and protruded part 78) which is provided between the placing face and the reading part so that a part of an edge of the cover member attached to the attaching part is supported from a side of the placing face.

According to the above-mentioned structure (2), the cover member is supported by the attaching part and the support part and thus, a position of the cover member can be stabilized and only the necessary information recording part can be exposed stably.

(3) The card processing device described in the above-mentioned structure (1) or (2) further includes a section forming member (section forming member 70) in a frame shape which is provided between the placing face and the read part, and the attaching part is provided so as to protrude from a first wall part (right wall part 70A) of the section forming member to an inner side.

According to the above-mentioned structure (3), an attaching portion of the cover member is provided at one position and thus, attachment of the cover member is easily performed, and the structure can be simplified.

(4) The card processing device described in the above-mentioned structure (3) further includes at least one support part (protruded part 76, protruded part 77 and protruded part 78) which is provided between the placing face and the reading part so that a part of an edge of the cover member attached to the attaching part is supported from a side of the placing face, and the support part includes a first support part (protruded part 76 and protruded part 78) which is provided so as to protrude toward an inner side from each of a pair of second wall parts (rear wall part 70B and front wall part 70D) which intersect the first wall part of the section forming member and face each other.

According to the above-mentioned structure (4), even in a case that a cover member having a different shape is attached, the first support part is provided at two positions and thus, the cover member can be supported by either of the first support parts and the position of the cover member can be stabilized.

(5) The card processing device described in the above-mentioned structure (4) further includes two position detection elements (a pair of the optical element 73 and the optical element 63 and a pair of the optical element 74 and the optical element 64) for optically detecting positions of both ends in a conveyance direction ("X" direction) of the card which is placed on the placing face formed on an inner side (partitioned region) of the section forming member when viewed in a direction ("Z" direction) perpendicular to the placing face, and the first support part is provided so as to protrude to an inner side of the section forming member with respect to the position detection elements.

According to the above-mentioned structure (5), an edge of the cover member supported by the first support part is disposed on an inner side with respect to the position detection element and thus, a position of the cover member can be stabilized without disturbing a function of the position detection element.

(6) The card processing device described in one of the above-mentioned structures (3) through (5) includes a conveyance roller for conveying the card which is disposed on an inner side of the section forming member when viewed in a direction perpendicular to the placing face, and the conveyance roller is disposed between the placing face and the section forming member when viewed in a direction perpendicular to the placing face.

(7) The card processing device described in one of the above-mentioned structures (3) through (6) further includes at least one support part (protruded part 76, protruded part 77 and protruded part 78) which is provided between the placing face and the reading part so that a part of an edge of the cover member attached to the attaching part is supported from a side of the placing face, the support part includes a second support part (protruded part 77) which is provided so as to protrude from a second wall part (left wall part 70C) facing the first wall part of the section forming member toward an inner side, and the second support part is provided so as to be extended along the second wall part.

According to the above-mentioned structure (7), even in a case that a cover member in which a shape of an edge on an opposite side to the attaching part side is different is attached, the second support part is provided so as to be extended along the second wall part and thus, at least a part of an edge of the cover member on an opposite side to the attaching part side can be supported by the second support part, and a position of the cover member can be stabilized.

(8) The card processing device described in one of the above-mentioned structures (1) through (7) further includes the cover member which is attached to the attaching part.

(9) A cover member (cover member 51 and cover member 52) which is provided with an attached part (common part MA and common part 52A) capable of being attached to the attaching part of the card processing device described in one of the above-mentioned structures (1) through (7).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card processing device structured to process a card having a plurality of information recording parts from which information is capable of being optically read, the card processing device comprising:

a placing part which is formed with a placing face on which the card is placed;

a reading part which is provided on an upper side with respect to the placing face and is capable of reading information from the information recording part;

an attaching part for detachably attaching a cover member which covers at least one information recording part of the plurality of the information recording parts provided on the card which is placed on the placing face;

at least one support part which is provided between the placing face and the reading part and supports a part of an edge of the cover member attached to the attaching part from a side of the placing face; and a section forming member in a frame shape which is provided between the placing face and the reading part, wherein the attaching part is provided so as to protrude from a first wall part which is one of wall parts of the section forming member to an inner side.

2. The card processing device according to claim 1, further comprising at least one support part which is provided between the placing face and the reading part and supports a part of an edge of the cover member attached to the attaching part from a side of the placing face,
  wherein the support part comprises a first support part which is provided so as to protrude toward an inner side from each of a pair of second wall parts intersecting the first wall part of the section forming member and facing each other.

3. The card processing device according to claim 2, further comprising two position detection elements for optically detecting positions of both ends in a conveyance direction of the card which is placed on the placing face formed on an inner side of the section forming member when viewed in a direction perpendicular to the placing face,
  wherein the first support part is provided so as to protrude to an inner side of the section forming member with respect to the position detection element.

4. The card processing device according to claim 3, further comprising a conveyance roller for conveying the card which is provided on an inner side of the section forming member when viewed in a direction perpendicular to the placing face,
  wherein the conveyance roller is disposed between the placing face and the section forming member when viewed in a direction perpendicular to the placing face.

5. The card processing device according to claim 4, further comprising at least one support part which is provided between the placing face and the reading part and supports a part of an edge of the cover member attached to the attaching part from a side of the placing face,
  wherein the support part comprises a second support part which is provided so as to protrude from a second wall part facing the first wall part of the section forming member toward an inner side, and
  wherein the second support part is provided so as to be extended along the second wall part.

6. The card processing device according to claim 5, further comprising the cover member which is attached to the attaching part.

7. A cover member comprising an attached part which is capable of being attached to the attaching part of the card processing device defined in claim 5.

8. The card processing device according to claim 1, further comprising a section forming member in a frame shape which is provided between the placing face and the reading part,
  wherein the attaching part is provided so as to protrude from a first wall part which is one of wall parts of the section forming member to an inner side.

9. A card processing device structured to process a card having a plurality of information recording parts from which information is capable of being optically read, the card processing device comprising:
  a placing part which is formed with a placing face on which the card is placed;
  a reading part which is provided on an upper side with respect to the placing face and is capable of reading information from the information recording part;
  an attaching part for detachably attaching a cover member which covers at least one information recording part of the plurality of the information recording parts provided on the card which is placed on the placing face;
  at least one support part which is provided between the placing face and the reading part and supports a part of an edge of the cover member attached to the attaching part from a side of the placing face,
  wherein the support part comprises a first support part which is provided so as to protrude toward an inner side from each of a pair of second wall parts intersecting the first wall part of the section forming member and facing each other.

10. The card processing device according to claim 9, further comprising two position detection elements for optically detecting positions of both ends in a conveyance direction of the card which is placed on the placing face formed on an inner side of the section forming member when viewed in a direction perpendicular to the placing face,
  wherein the first support part is provided so as to protrude to an inner side of the section forming member with respect to the position detection element.

11. The card processing device according to claim 8, further comprising a conveyance roller for conveying the card which is provided on an inner side of the section forming member when viewed in a direction perpendicular to the placing face,
  wherein the conveyance roller is disposed between the placing face and the section forming member when viewed in a direction perpendicular to the placing face.

12. The card processing device according to claim 8, further comprising at least one support part which is provided between the placing face and the reading part and supports a part of an edge of the cover member attached to the attaching part from a side of the placing face,
  wherein the support part comprises a second support part which is provided so as to protrude from a second wall part facing the first wall part of the section forming member toward an inner side, and
  wherein the second support part is provided so as to be extended along the second wall part.

13. The card processing device according to claim 1, further comprising the cover member which is attached to the attaching part.

14. A cover member comprising an attached part which is capable of being attached to the attaching part of the card processing device defined in claim 1.

* * * * *